United States Patent
Palanivel et al.

(10) Patent No.: US 12,141,631 B1
(45) Date of Patent: Nov. 12, 2024

(54) VALIDATING IMAGE CONTENT AND FORMAT USING ARTIFICIAL INTELLIGENCE

(71) Applicant: Citibank, N.A., New York, NY (US)

(72) Inventors: Sakthivel Palanivel, Irving, TX (US); Ashleigh Trout, Irving, TX (US); Surendra Gangadhar Dumane, Irving, TX (US); Jennifer Joy Bordon, Irving, TX (US); Ashim Mohanty, Irving, TX (US); Monique Huang, Jacksonville, FL (US); Miriam Silver, Tel Aviv (IL)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/624,907

(22) Filed: Apr. 2, 2024

(51) Int. Cl.
*G06K 15/02* (2006.01)
*G06K 15/00* (2006.01)
*G06T 7/00* (2017.01)

(52) U.S. Cl.
CPC ......... *G06K 15/021* (2013.01); *G06K 15/002* (2013.01); *G06T 7/0002* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 4,873,643 A | * | 10/1989 | Powell | B41F 15/0863 700/87 |
| 2008/0308636 A1 | * | 12/2008 | Lynch | G06Q 20/10 235/432 |
| 2016/0188783 A1 | * | 6/2016 | Li | G06F 30/00 716/112 |
| 2020/0160612 A1 | * | 5/2020 | Bowen | G06F 30/20 |
| 2022/0348003 A1 | * | 11/2022 | Daher | G06T 7/12 |

* cited by examiner

*Primary Examiner* — Thomas D Lee
(74) *Attorney, Agent, or Firm* — Perkins Coie LLP

(57) ABSTRACT

Systems and methods are described herein for novel uses and/or improvements for using artificial intelligence to determine whether an image is valid and/or formatted appropriately for printing onto a physical object. An image validation system may receive an image, for example, from a user. The image may be received in order to print the image onto a physical object. When the image is received, the validation system may use a first machine learning model to format the image appropriately and then use another machine learning model to determine whether the image has an appropriate context (e.g., no violence). Based on that determination, the validation system may either send the image for printing or try to remove the offending content from the image.

20 Claims, 7 Drawing Sheets

| Conform Model Identifier | Parameters | Input Data |
|---|---|---|
| Model 1 | Param_1<br>Param_2<br>Param_3 | Param_1 – Data 1<br>Param_2 – Data 2<br>Param_3 - Data 3 |
| Model 2 | Param_4 | Param_4 – Data 4 |

VALIDATING IMAGE CONTENT AND FORMAT USING ARTIFICIAL INTELLIGENCE

SUMMARY

In recent years, the use of artificial intelligence, including but not limited to machine learning, deep learning, etc. (referred to collectively herein as "artificial intelligence"), has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. Artificial intelligence and, in particular, machine learning models are being used in many technological fields, including image recognition and modification. Furthermore, printing custom and modified images on objects has become popular. One problem that providers of printing services face is whether the printed content complies with various rules (e.g., against violence, nudity, trademark infringement, etc.). Thus, it may be desirable to use artificial intelligence (e.g., machine learning) to ensure that images printed on physical objects are valid.

Accordingly, systems and methods are described herein for novel uses and/or improvements for using artificial intelligence to determine whether an image is valid. An image validation system may be used to perform operations described herein. In some embodiments, the image validation system may receive an image. The image may be received from a user device or from another suitable device. The image may be received in order to print the image onto a physical object. In some embodiments, the image may be a digital photograph captured by the user or another image (e.g., from an image database). For example, the validation system may cause a user device to prompt the user to enter a description of an image desired by the user. The validation system may query an image database for the best matching image, which may, based on the description, retrieve the best matching image. In some embodiments, the validation system may input the description into a large language model that may generate an image based on the description.

The validation system may then use a machine learning model to format the image so that the image is enabled to be printed on a physical object. Thus, the validation system may input an image in a first format into a first machine learning model to obtain a formatted image in a second format. The first machine learning model may be one that has been trained to output formatted images in a format that conforms to one or more object parameters associated with a physical object. For example, a training routine of a machine learning model may take, as input, image pairs including an original image and a corresponding image formatted to be printed onto the physical object. Using the image pairs, the machine learning model may be trained to output a formatted image with a layout, color scheme, contrast, and/or other parameters for printing the image onto a physical object. In some embodiments, multiple machine learning models may be trained such that each machine learning model corresponds to a particular physical object. Thus, the validation system may be able to transform images for printing onto different physical objects.

When the image has been formatted to conform with printing onto a physical object, the validation system may determine, using a machine learning model, whether the image is valid in view of a particular set of parameters. Thus, the validation system may input the formatted image into a plurality of machine learning models to obtain a plurality of predictions indicating whether the formatted image conforms to a plurality of predetermined parameters. Each machine learning model of the plurality of machine learning models may be trained to predict a corresponding predetermined parameter. For example, various parameters may be stored within the validation system indicating rules for violence, nudity/sexual content, violation of trademarks/copyrights, existence of logos or political slogans, and or other parameters. In some embodiments, the validation system may store a trained machine learning model for each parameter. However, it is not always necessary to have a machine learning model per a parameter. For example, some parameters may be combined. For example, one machine learning model may cover violence, nudity, inappropriate language, etc. This may be achieved by generating a description of the image using an image-to-text machine learning model. The text may then be input into a text analysis model that is able to output one or more contexts/keywords associated with the image. If any of those contexts are determined to violate a parameter (e.g., violence), the validation system may receive an indication that the image is invalid.

After all the machine learning models have been run, the validation system may determine whether the image is valid. In particular, the validation system may determine that a prediction of the plurality of predictions indicates that the formatted image does not conform to the corresponding predetermined parameter. For example, the validation system may determine that the image does not pass a nudity parameter. That is, the validation system may determine that there is nudity within the potential image that is to be printed onto the physical object. The validation system may make the determination using several methods. For example, the validation system may have input the image into a machine learning model that has been trained to predict which images have nudity in them. The machine learning model may have output a flag indicating that nudity has been detected. In another example, the validation system may have input the image into a machine learning model trained to generate a textual description of the image. Based on the textual description, the validation system may determine that the description includes nudity (e.g., the description contains one or more nudity keywords).

The validation system may then determine whether the prediction is associated with a second machine learning model that is enabled to modify the formatted image to conform the formatted image to the corresponding predetermined parameter. For example, the validation system may be able to access a machine learning model that has been trained to remove nudity from images. The validation system may determine whether such a machine learning model is available.

Based on determining that such a machine learning model is available, the validation system may use that machine learning model to remove nudity from the image. In particular, based on determining that the prediction is associated with the second machine learning model that is enabled to modify the formatted image to conform the formatted image to the corresponding predetermined parameter, the validation system may input the formatted image into the second machine learning model to obtain a final image. As discussed above, the second machine learning model may be one that is trained to modify images to conform with the corresponding predetermined parameter. The validation system may then transmit the final image to a printing system. For example, when the image has been validated, the validation system may transmit that image to be printed onto the physical object. In some embodiments, the validation system may store that image in storage to be used later or by another user.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 3 illustrates an excerpt of a data structure storing confirmation model identifiers and corresponding parameters, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of this disclosure may be practiced without these specific details or with an equivalent arrangement. In other cases, well-known structures and devices are shown in block diagram form in order to avoid unnecessarily obscuring the embodiments of the invention.

Figure 1:
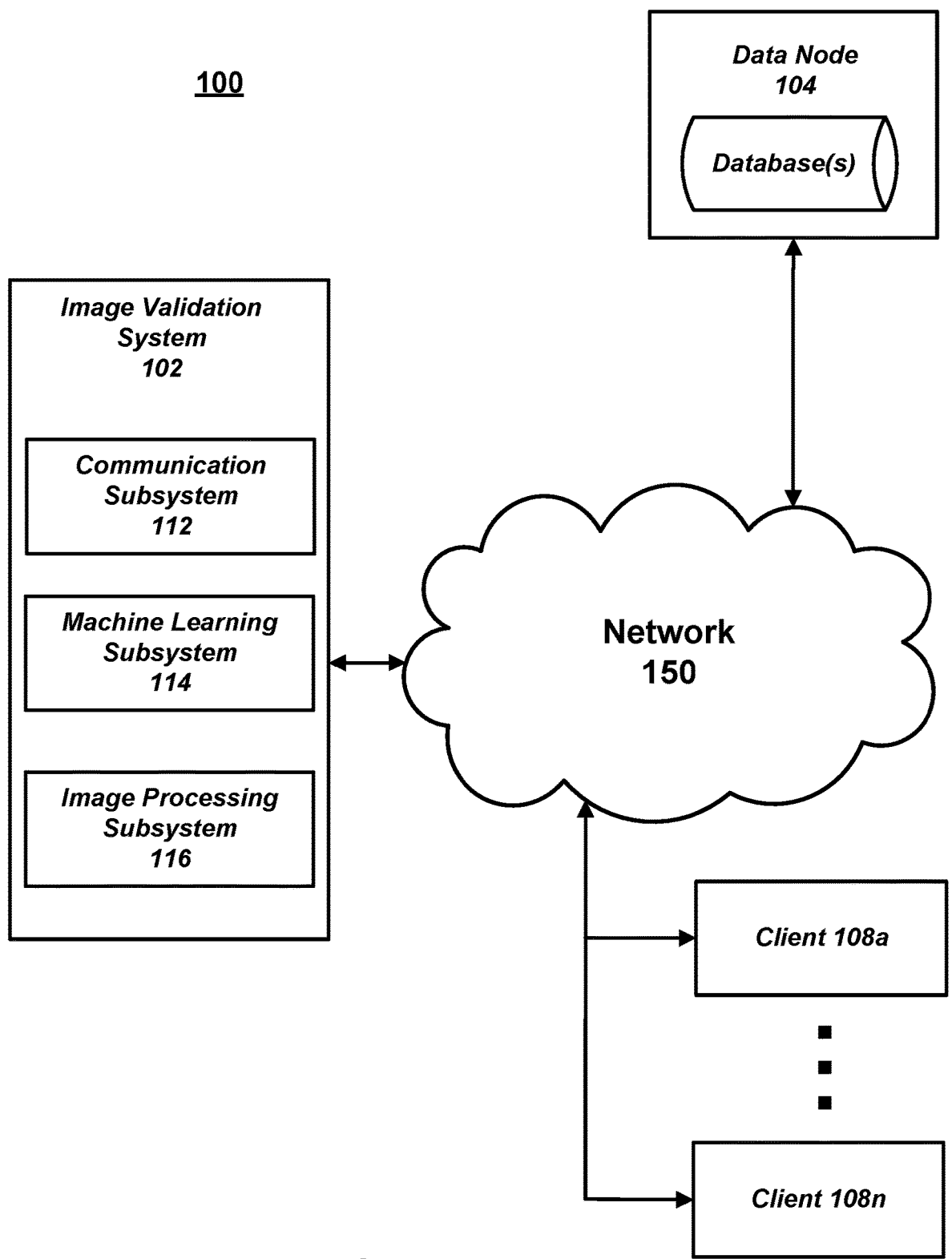
FIG. 1 shows an illustrative system for validating image context and formatting, in accordance with one or more embodiments.

FIG. 1 is an example of environment 100 for validating image context and formatting. Environment 100 may be hosted on a user computing device, on a server, or another suitable computing device. Environment 100 includes image validation system 102, data node 104, and clients 108a-108n. Image validation system 102 may execute instructions for validating image context and formatting. Image validation system 102 may include software, hardware, or a combination of the two. For example, image validation system 102 may reside on a physical server or a virtual server that is running on a physical computer system. In some embodiments, image validation system 102 may be configured on a user device (e.g., a laptop computer, a smartphone, a desktop computer, an electronic tablet, or another suitable user device).

Data node 104 may store various data, including one or more machine learning models, training data, image database(s), and/or other suitable data. Data node 104 may include a combination of hardware (e.g., memory and/or disk) and software (e.g., for reading/writing data to the hardware). Network 150 may be a local network, a global network (e.g., the Internet), or a combination of location and global networks. Clients 108a-108n may be client devices being used by end users (e.g., desktop computers, laptops, electronic tablets, smartphones, and/or other computing devices used by end users).

In some embodiments, image validation system 102 may receive an image (e.g., from a user device). The image may be received for printing on a physical object. The image may be in a first format. For example, a user may be executing an application on the user's device (e.g., on a smartphone, an electronic tablet, or another suitable user/client device). The application may enable a user to select an image to be printed onto an object. In some embodiments, the object may be a credit card or a debit card. In other embodiments, the object may be a fob or another suitable object. In yet other embodiments, an object may be something worn by the user. Thus, in some embodiments, the image may be received from one of clients 108a-108n. In some embodiments, image validation system 102 may receive the image from data node 104 or another suitable node.

Image validation system 102 may receive the image via communication subsystem 112. Communication subsystem 112 may include software components, hardware components, or a combination of both. For example, communication subsystem 112 may include software that is enabled to communicate via a network (e.g., network 150).

As discussed above, in some embodiments, communication subsystem 112 may receive the image from one of clients 108a-108n (e.g., user devices such as smartphones, electronic tablets, laptops, etc.). However, communication subsystem 112 may receive, instead of the image, an indication of an image, such as a link or another suitable indication. Communication subsystem 112 may pass the image, the link to the image, or a pointer to the image in memory to machine learning subsystem 114. Machine learning subsystem 114 may include software components, hardware components, or a combination of both. For example, machine learning subsystem 114 may include software components (e.g., application programming interface (API) calls) that access one or more machine learning models.

In some embodiments, machine learning subsystem 114 may cause a user device to prompt the user for an image to be printed on an object (e.g., on a credit card). In particular, machine learning subsystem 114 may cause a user device to generate for display a prompt prompting a user to select the image for printing on the physical object. For example, a user may be using a smartphone to interact with an application associated with a credit card issuer or a bank associated with the credit card. The application on the smartphone may be interacting with a server system (e.g., a system hosting image validation system 102). Image validation system 102 may determine that a user has been approved for a new credit card or requires a new debit card. In this instance, image validation system 102 (e.g., communication subsystem 112) may send a command to the application on the user device to generate a prompt enabling a user to select an image. In some embodiments, the image may be selected from the smartphone itself. However, the image may be selected from images available on the Internet. When the user selects the image and the smartphone receives the selection, the application on the smartphone may transmit the image or an indication of the image (e.g., a link) to image validation system 102. Image validation system 102 may receive the image from the user device (e.g., a client of clients 108a-108n) through communication subsystem 112, which may pass the image or a link to the image to machine learning subsystem 114.

When the image is received or retrieved, machine learning subsystem 114 may use a machine learning model to format the image so that the image may be changed into a format for printing on an object (e.g., on a credit card, a debit card, a fob, etc.). Thus, machine learning subsystem 114 may input an image in a first format into a first machine learning model to obtain a formatted image in a second format. The first machine learning model may be one that has been trained to output formatted images in a format that conforms to one or more object parameters associated with a physical object. In some embodiments, the image may be changed by first the machine learning model to conform to a layout, a color scheme, a contrast, and or other parameters for printing the image.

In one example, the user may have selected the image to be printed on a credit card. The credit card may have a certain shape that may inform the resolution of the image. That is, the machine learning model may change the resolution of the image to fit properly onto the credit card. Furthermore, the credit card may include areas that are not appropriate to print on. For example, the credit card may include a space for a microchip. Thus, the machine learning model may ensure that nothing important (e.g., someone's face) is printed where the microchip will be installed. That may inform the layout of the newly formatted image. In another example, the printer for the credit cards may only support certain colors but not others. Accordingly, the machine learning model may change that colors of the image so that only supported colors make up the image. In yet another example, if the image is being printed on the credit card, certain portions of the card may have to have a certain color contrast. One such portion may be where the credit card number is shown. If there is no contrast, it may be difficult for the user to read the credit card number. Thus, the machine learning model may update the image to have a particular contrast in particular areas of the object.

When the image is formatted or in parallel with formatting the image, machine learning subsystem 114 may determine whether the context of the image is appropriate. In some embodiments, machine learning subsystem 114 may determine whether the context of the image is appropriate prior to formatting the image. Thus, machine learning subsystem 114 may input the formatted image into a plurality of machine learning models to obtain a plurality of predictions indicating whether the formatted image conforms to a plurality of predetermined parameters. Each machine learning model may have been trained to predict a corresponding predetermined parameter of the plurality of predetermined parameters.

In some embodiments, one predetermined parameter may be presence of violence in the image. It may be useful for a credit card issuer to prevent users from putting violent images on their credit cards because it may have an adverse effect on the reputation of the credit card issuer. Thus, machine learning subsystem 114 may have access to a machine learning model that may take the image as input and output a probability or a score indicating whether the image includes violent content. In some embodiments, the machine learning model may output a yes/no or true/false to indicate whether the image includes violent content. In another example, another parameter may be nudity. That is, machine learning subsystem 114 may input the image into a machine learning model that may output a probability or a score indicating whether the image includes nudity. In some embodiments, the machine learning model may output a yes/no or true/false to indicate whether the image includes nudity. In some embodiments, a single machine learning model may predict whether the image contains violent content and/or nudity. However, in other embodiments, one machine learning model may predict whether an image contains nudity, and another machine learning model may predict whether the image contains violent content.

Figure 2:
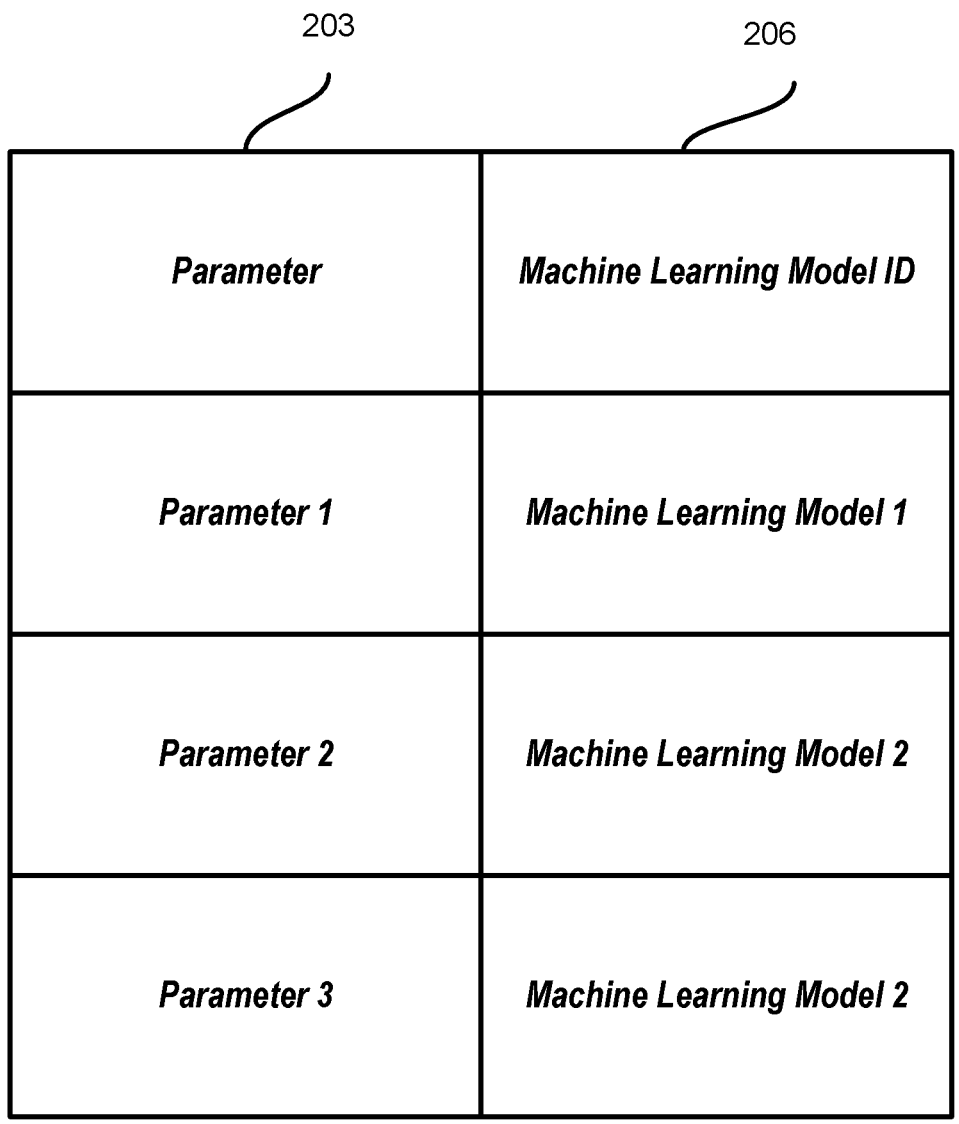
FIG. 2 illustrates an excerpt of a data structure for storing parameters and corresponding machine learning model identifiers, in accordance with one or more embodiments.

In some embodiments, machine learning subsystem 114 may determine whether the image conforms to other parameters, such as inappropriate content generally. In addition, machine learning subsystem 114 may detect whether the image includes any trademarks, copyrighted material, logos, political slogans, and or other undesirable content. FIG. 2 illustrates an excerpt of a data structure 200 for storing parameters and corresponding machine learning model identifiers. Field 203 stores parameter identifiers (e.g., violence, nudity, trademark, copyright, logos, slogans, etc.). Field 206 may store a corresponding machine learning model that may output an indicator that indicates whether the image conforms to the corresponding parameter. In some embodiments, image validation system 102 may include flexibility to add and/or remove parameters and machine learning models. For example, the credit card issuer may have a policy that prohibits users from adding political slogans to credit cards using the system. However, that policy may change. Accordingly, image validation system 102 may enable an operator to remove or disable that parameter so that no check occurs for slogans. In another example, a credit card issuer may add a vulgarity parameter and a corresponding machine learning model. That is, the credit card issuer may want to detect any vulgar words or phrases and disallow those from being printed on the credit card. Thus, an operator may be able to add a new parameter to data structure 200 and a corresponding identifier of the machine learning model.

In some embodiments, machine learning subsystem 114 may perform the following operations when inputting the formatted image into the machine learning models. Machine learning subsystem 114 may determine the plurality of predetermined parameters from available parameters. For example, machine learning subsystem 114 may determine which parameters should be checked. As discussed above, some parameter checks may be disabled due to changing policies, while others may be enabled. Machine learning subsystem 114 may then identify the plurality of machine learning models corresponding to the plurality of predetermined parameters. For example, machine learning subsystem 114 may traverse a data structure (e.g., data structure 200) in memory and identify each parameter that is to be checked. Machine learning subsystem 114 may also identify a corresponding machine learning model (e.g., within field 206). Machine learning subsystem 114 may then input the formatted image into each machine learning model of the plurality of machine learning models. For example, machine learning subsystem 114 may use the corresponding model identifiers in field 206 to input the image (e.g., through an API) into a machine learning model for the corresponding parameter. In some embodiments, field 206 may include a command format for submitting the input into the machine learning model.

As discussed above, image validation system 102 may enable an operator to add a parameter for detection/checking. Thus, machine learning subsystem 114 may receive a request to add a new predetermined parameter to the plurality of predetermined parameters. For example, an application being executed on an operator's device (e.g., on client 108a) may enable an operator to add another parameter to the list. Thus, the operator may be able to select from available parameters or may generate a completely new parameter. Machine learning subsystem 114 may receive the selection and identify a corresponding machine learning model for predicting the new predetermined parameter. For example, machine learning subsystem 114 may identify the machine learning model from available models within FIG. 2. In some embodiments, the new parameter may be associated with a completely new machine learning model. Thus, the operator may transmit to machine learning subsystem 114 a command to access the model and/or input the image into the model. Machine learning subsystem 114 may receive the command and/or the model identifier and add the corresponding machine learning model to the plurality of machine learning models. For example, machine learning subsystem 114 may add a new entry to data structure 200 with a new parameter and a new corresponding model identifier.

In some embodiments, machine learning subsystem 114 may utilize an image-to-text machine learning model as one or more machine learning models. In particular, machine learning subsystem 114 may perform the following operations when inputting the formatted image into the plurality of machine learning models to obtain the plurality of predictions indicating whether the formatted image conforms to the plurality of predetermined parameters. Machine learning subsystem 114 may input the formatted image into an image-to-text machine learning model to obtain an image description of the formatted image. The image-to-text machine learning model may be one that has been trained to generate image descriptions based on objects within the image that are input into the model. Machine learning subsystem 114 may receive the image description from the image-to-text machine learning model.

When the image description is received from the image-to-text machine learning model, machine learning subsystem 114 may compare the description with predetermined parameters to determine whether there is a keyword match. In particular, machine learning subsystem 114 may compare the image description with keyword sets associated with a subset of the plurality of predetermined parameters. For example, the keyword sets may be associated with different types of undesired images, such as images that contain nudity, violence, political slogans, etc. Accordingly, machine learning subsystem 114 may determine whether the description matches one or more parameters based on whether the keywords match. That is, machine learning subsystem 114 may determine whether the image description matches one or more keyword sets.

When the comparison is completed, machine learning subsystem 114 may determine, based on the comparison, whether the description of the image matches one or more parameters. That is, machine learning subsystem 114 may, based on determining that the image description matches a keyword set of the keyword sets, generate an indication that the formatted image does not conform to a corresponding parameter. For example, if the description matches a keyword set for nudity (e.g., a first parameter) and/or a keyword set for violence (e.g., a second parameter), machine learning subsystem 114 may determine that image does not conform to a corresponding parameter.

In some embodiments, machine learning subsystem 114 may determine that a prediction of the plurality of predictions indicates that the formatted image does not conform to the corresponding predetermined parameter without using an image-to-text machine learning model. For example, machine learning subsystem 114 may receive an indication from a particular machine learning model that the image violates a known trademark. This may be done using a machine learning model that performs image-to-image comparison (e.g., determining image similarity).

When machine learning subsystem 114 determines that the image conforms to all the predetermined parameters, machine learning subsystem 114 may send the image for printing. For example, machine learning subsystem 114 may determine that the image does not include violence, sexual content, political slogans, etc. However, if machine learning subsystem 114 determines that the image does include undesired content, machine learning subsystem 114 may try to fix the image if possible. In particular, machine learning subsystem 114 may determine whether the prediction is associated with a second machine learning model (e.g., a corresponding conform model) that is enabled to modify the formatted image to conform the formatted image to the corresponding predetermined parameter. FIG. 3 illustrates an excerpt of a data structure 300 that stores confirmation model identifiers and corresponding parameters. Field 303 may include an identifier of a conform model, which may be used to access the conform model. The identifier may also include a link to, or a location of, the corresponding conform model. Field 306 may store which parameters the corresponding conform model is able to conform. For example, a particular conform model may be able to change the image so that it no longer includes copyrightable material or any trademarks. Another conform model may enable removal of nudity (e.g., blurring of nudity) from an image and/or removal of violent content from the image. Field 309 may store data that is needed by the machine learning model to edit the image so that the image conforms. Thus, machine learning subsystem 114 may traverse data structure 300 to determine whether the image may be conformed using one of those machine learning models.

In some embodiments, if machine learning subsystem 114 determines that there is a conform model that is able to conform the image, machine learning subsystem 114 may use that machine learning model by inputting the image into the appropriate conform model. In particular, machine learning subsystem 114 may, based on determining that the prediction is associated with the second machine learning model that is enabled to modify the formatted image to conform the formatted image to the corresponding predetermined parameter, input the formatted image into the second machine learning model to obtain a final image. The second machine learning model may be one that is trained to modify images to conform with the corresponding predetermined parameter. Machine learning subsystem 114 may receive an updated image from the conform machine learning model. For example, the conform model may use an image modification algorithm to blur out or cover any nudity and/or remove any violent content. In some embodiments, the same conform model may address multiple parameters (e.g., nudity and violence and/or trademark detection). However, in some embodiments, a particular conform model may address only one parameter (e.g., only detecting and removing trademarks from images).

In some embodiments, machine learning subsystem 114 may determine that a conform model is not available for the parameter with which the image does not conform. For example, it may not be possible to remove violent content from an image. Accordingly, machine learning subsystem 114 may pass those images to image processing subsystem 116. Image processing subsystem 116 may include software components, hardware components, or a combination of both. Image processing subsystem 116 may then attempt to provide a replacement image to the user.

In some embodiments, image processing subsystem 116 may perform the following operations based on determining that the prediction is not associated with the second machine learning model. Image processing subsystem 116 may attempt to provide to a user an image that is similar to the user's image. Thus, image processing subsystem 116 may generate, using a third machine learning model, a plurality of keywords associated with the image. For example, image processing subsystem 116 may use an image-to-text model to generate a plurality of keywords associated with the original image that the user has selected.

The keywords associated with the image may include undesired terms (e.g., nudity, violence, sexual content, etc.). Thus, image processing subsystem 116 may filter those terms. Thus, image processing subsystem 116 may filter the plurality of keywords based on a predetermined keyword set into a filtered keyword set. For example, the set of keywords associated with the image may include one or more keywords indicating sexual content. The set of predetermined keywords may include some of those same keywords. Thus, image processing subsystem 116 may compare the keywords and remove the matching keywords from the keyword set associated with the image.

Image processing subsystem 116 may then retrieve, based on the filtered keyword set, a second image that is described by the filtered keyword set. In some embodiments, image processing subsystem 116 may use a large language model for generating a second image based on the keywords. In particular, image processing subsystem 116 may input the filtered keyword set into a large language machine learning model to obtain the second image based on the filtered keyword set. In some embodiments, image processing subsystem 116 may also include a prompt with the filtered keywords set (e.g., "generate an image based on the following keywords"). In some embodiments, image processing subsystem 116 may input the keywords into a general machine learning model that may use the keywords to match with a preexisting image. For example, the general machine learning model may output the image that is the most likely/probable to fit the keywords.

In some embodiments, image processing subsystem 116 may use the keywords to find an image in a database without using a machine learning model or a large language model. In particular, image processing subsystem 116 may use the following operators when retrieving, based on the filtered keyword set, the second image that is described by the filtered keyword set. Image processing subsystem 116 may compare the filtered keyword set with a plurality of keyword sets associated with a plurality of images stored in a database. For example, image processing subsystem 116 may filter the undesired keywords and then compare the remaining keywords with the keywords associated with a plurality of images within a database.

Based on comparing the filtered keyword set with the plurality of keyword sets, image processing subsystem 116 may determine a best matching keyword set. For example, the best match may be determined based on a number of keywords matching. In some embodiments, each keyword with the keywords associated with images within the database may have different weights, which image processing subsystem 116 may take into account in determining the best image. Thus, image processing subsystem 116 may then select the second image that corresponds to the best matching keyword set. In some embodiments, image processing subsystem 116 may select multiple best matching images for the user to choose from. For example, image processing subsystem 116 may select five images with the five highest matching totals.

Figure 4:
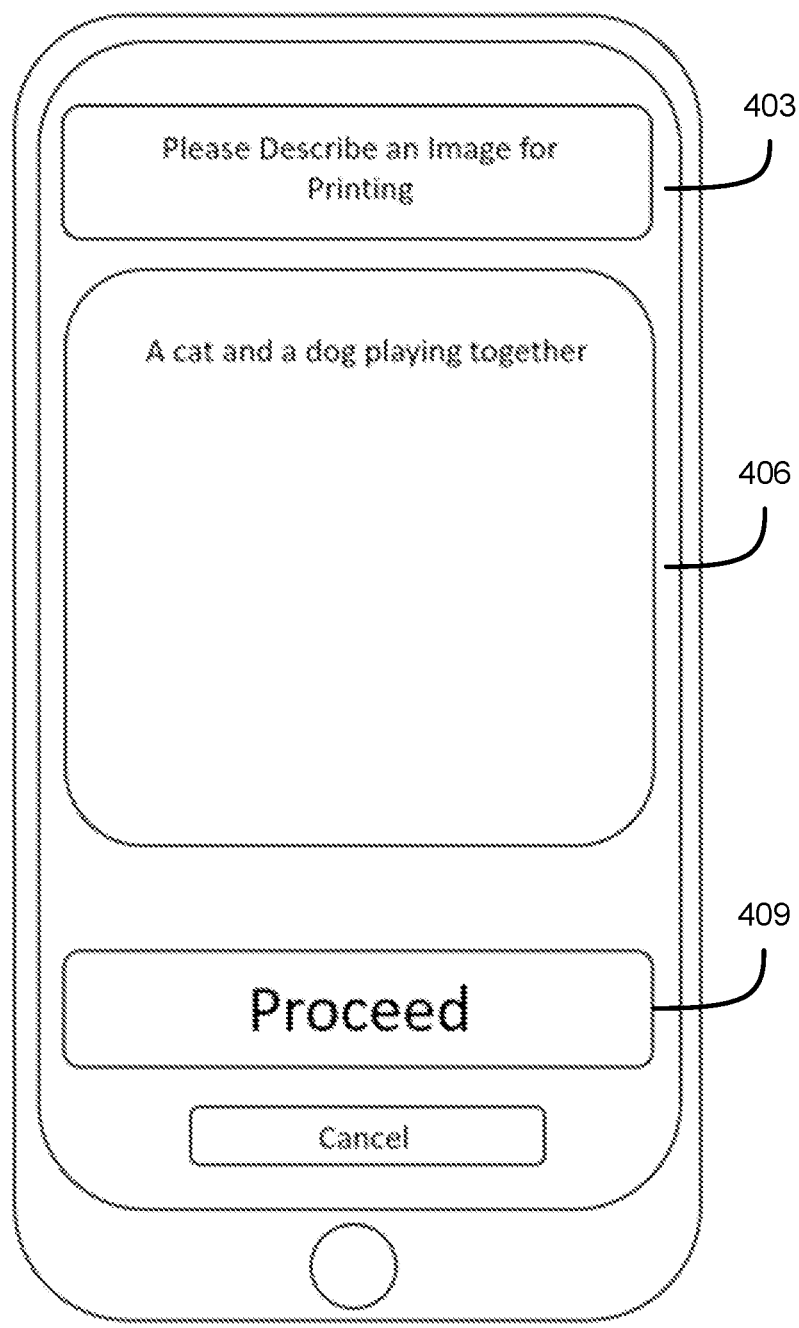
FIG. 4 illustrates an exemplary user interface for obtaining an image based on a description, in accordance with one or more embodiments.

In some embodiments, instead of causing the smartphone to prompt the user to select an image, image validation system 102 may enable a user to describe the image. In particular, machine learning subsystem 114 may cause a user device (e.g., client 108*a*) to generate for display a request for a user to describe the image to be printed on the physical object. FIG. 4 illustrates an exemplary user interface 400 for obtaining an image based on a description. FIG. 4 may include a prompt 403 that instructs a user how to proceed. In addition, FIG. 4 may include a text area 406 that enables a user to type in the text that describes a desired image and active element 409 enabling the user to execute. When the user types in the text for a desired image and hits proceed (e.g., active element 409), image processing subsystem 116 may receive a description from the user device of the desired image. Image processing subsystem 116 may then retrieve the image based on the description. In some embodiments, image processing subsystem 116 may retrieve the image from a database of clean images.

In some embodiments, image processing subsystem 116 may provide an image to the user from a database of clean images (e.g., known good images to be used) in some instances. In particular, image processing subsystem 116 may receive a new image from a user device. The new image may be a subsequent attempt for the image to be printed onto an object. For example, a user may have tried four previous images that were all rejected and could not be conformed to the predetermined parameters. Image processing subsystem 116 may then determine that the subsequent attempt meets a threshold number of attempts. For example, a threshold number of tries may be five. Thus, image processing subsystem 116 may determine that a maximum number of attempts has been reached. In response, image processing subsystem 116 may select an image for the user. In particular, image processing subsystem 116 may select a valid image from an image database. The valid image may be identified based on keywords associated with the new image. For example, the image database may store valid images that conform to the plurality of predetermined parameters and to the one or more object parameters associated with the physical object. Image processing subsystem 116 may be based on a user trying another image, identify the keywords associated with that image, and select an image from the database that best matches those keywords (e.g., as described above).

When the image is valid and has been formatted to be printed on the object (e.g., a plastic card, a fob, or another suitable object), image processing subsystem 116 may transmit the image to a printing system. For example, different printing systems may be able to print on different objects. Thus, image processing subsystem 116 may transmit (e.g., using communication subsystem 112) the image to the appropriate printing system, such as a plastic card printing system, a metal card printing system, or a fob printing system. The image may be transmitted to the printing system with a command to print the image. Thus, the printing system may print the image onto the physical object.

Figure 5:
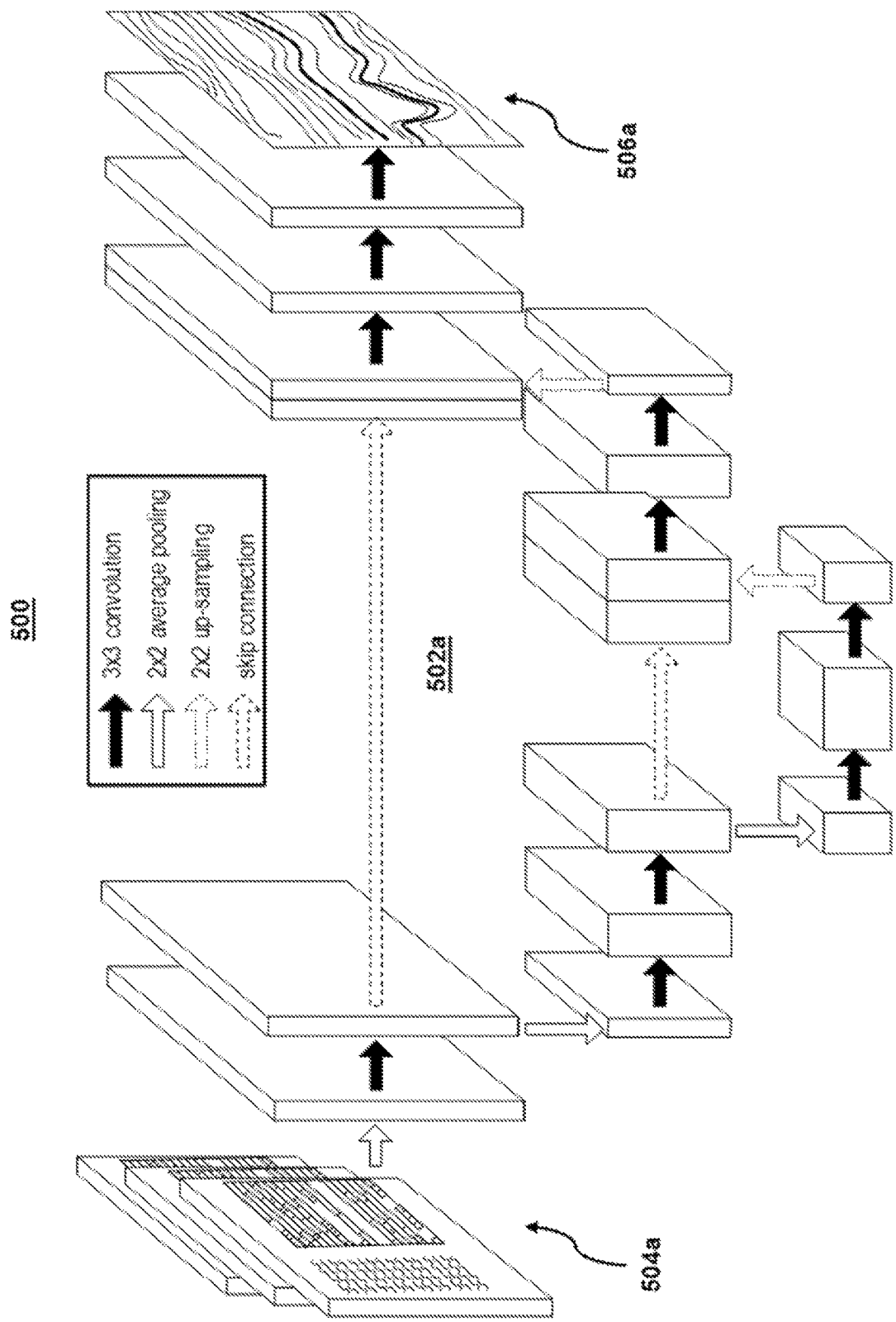
FIG. 5 shows illustrative components for a machine learning model used for validating image context and formatting, in accordance with one or more embodiments.

FIG. 5 shows illustrative components for a system used for providing user interfaces using artificial intelligence, in accordance with one or more embodiments. System 500 includes model 502a, which may be a machine learning model, artificial intelligence model, etc. (which may be referred to collectively as "models" herein). Model 502a may take inputs 504a and provide outputs 506a. The inputs may include multiple datasets, such as a training dataset and a test dataset. Each of the plurality of datasets (e.g., inputs 504a) may include data subsets related to user data, predicted forecasts and/or errors, and/or actual forecasts and/or errors. In some embodiments, outputs 506a may be fed back to model 502a as input to train model 502a (e.g., alone or in conjunction with user indications of the accuracy of outputs 506a, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction.

In a variety of embodiments, model 502a may update its configurations (e.g., weights, biases, or other parameters) based on the assessment of its prediction (e.g., outputs 506a) and reference feedback information (e.g., user indication of accuracy, reference labels, or other information). In a variety of embodiments, where model 502a is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the model 502a may be trained to generate better predictions.

In some embodiments, the model (e.g., model 502a) may automatically perform actions based on outputs 506a. In some embodiments, the model (e.g., model 502a) may not perform any actions. The output of the model (e.g., model 502a) may be used to generate a user token and/or a user interface token. That is, a generic model 502a may be trained to generate user tokens and may be referred to as a user token generation machine learning model. Another generation model 502a may be trained to generate user interface tokens, as described above.

Figure 6:
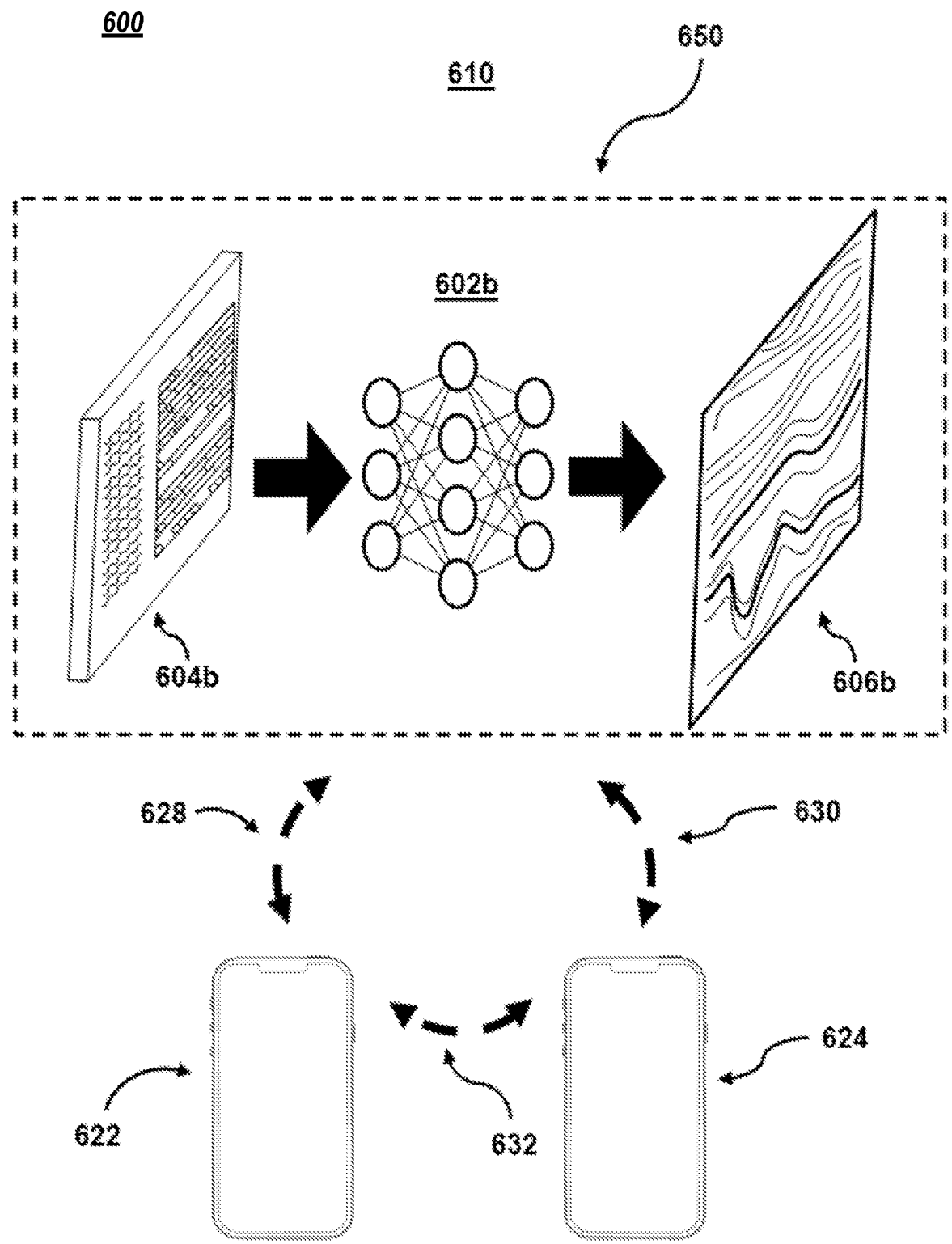
FIG. 6 shows illustrative components for a system used for validating image context and formatting, in accordance with one or more embodiments.

As shown in FIG. 6, the system may include mobile device 622 and mobile device 624. While shown as smartphones in FIG. 6, it should be noted that mobile device 622 and mobile device 624 may be any computing device, including, but not limited to, a laptop computer, a tablet computer, a handheld computer, and other computer equipment (e.g., a server), including "smart," wireless, wearable, and/or mobile devices. System 600 may also include cloud components. For example, cloud components may be implemented as a cloud computing system and may feature one or more component devices. It should be noted that, while one or more operations are described herein as being performed by particular components of system 600, these operations may, in some embodiments, be performed by other components of system 600. As an example, while one or more operations are described herein as being performed by components of mobile device 622, these operations may, in some embodiments, be performed by cloud components. In some embodiments, the various computers and systems described herein may include one or more computing devices that are programmed to perform the described functions. Additionally, or alternatively, multiple users may interact with system 600 and/or one or more components of system 600.

With respect to the components of mobile device 622 and mobile device 624, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 6, both mobile device 622 and mobile device 624 include a display upon which to display data.

Additionally, as mobile device 622 and mobile device 624 are shown as touchscreen smartphones, these displays also act as user input interfaces. It should be noted that in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 600 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 6 also includes communication paths 628, 630, and 632. Communication paths 628, 630, and 632 may include the internet, a mobile phone network, a mobile voice or data network (e.g., a 5G or LTE network), a cable network, a public switched telephone network, or other types of communications networks or combinations of communications networks. Communication paths 628, 630, and 632 may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 600 also includes API layer 650. API layer 650 may allow the system to generate summaries across different devices. In some embodiments, API layer 650 may be implemented on mobile device 622 or mobile device 624. Alternatively, or additionally, API layer 650 may reside on one or more of cloud components 610. API layer 650 (which may be a REST or Web services API layer) may provide a decoupled interface to data and/or functionality of one or more applications. API layer 650 may provide a common, language-agnostic way of interacting with an application. Web services APIs offer a well-defined contract called WSDL that describes the services in terms of their operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 650 may use various architectural arrangements. For example, system 600 may be partially based on API layer 650, such that there is strong adoption of SOAP and RESTful Web services, using resources like Service Repository and Developer Portal, but with low governance, standardization, and separation of concerns. Alternatively, system 600 may be fully based on API layer 650, such that separation of concerns between layers like API layer 650, services, and applications are in place.

In some embodiments, the system architecture may use a microservice approach. Such systems may use two types of layers: front-end layers and back-end layers, where microservices reside. In this kind of architecture, the role of the API layer 650 may provide integration between front-end and back-end layers. In such cases, API layer 650 may use RESTful APIs (exposition to the front end or even communication between microservices). API layer 650 may use AMQP (e.g., Kafka, RabbitMQ, etc.). API layer 650 may use incipient usage of new communications protocols such as gRPC, Thrift, etc.

In some embodiments, the system architecture may use an open API approach. In such cases, API layer 650 may use commercial or open-source API Platforms and their modules. API layer 650 may use a developer portal. API layer 650 may use strong security constraints applying WAF and DDOS protection, and API layer 650 may use RESTful APIs as standard for external integration.

As shown in FIG. 6, in some embodiments, model 602b may be trained by taking inputs 604b and providing outputs 606b. Model 602b may include an artificial neural network. In such embodiments, model 602b may include an input layer and one or more hidden layers. Each neural unit of model 602b may be connected with many other neural units of model 602b. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 602b may be self-learning and trained, rather than explicitly programmed, and can perform significantly better in certain areas of problem solving as compared to traditional computer programs. During training, an output layer of model 602b may correspond to a classification of model 602b, and an input known to correspond to that classification may be input into an input layer of model 602b during training. During testing, an input without a known classification may be input into the input layer, and a determined classification may be output.

In some embodiments, model 602b may include multiple layers (e.g., where a signal path traverses from front layers to back layers). In some embodiments, backpropagation techniques may be utilized by model 602b where forward stimulation is used to reset weights on the "front" neural units. In some embodiments, stimulation and inhibition for model 602b may be more free flowing, with connections interacting in a more chaotic and complex fashion. During testing, an output layer of model 602b may indicate whether or not a given input corresponds to a classification of model 602b.

Model 602b is shown as a convolutional neural network. A convolutional neural network consists of an input layer (e.g., input 604b), hidden layers, and an output layer (e.g., output 606b). As shown in FIG. 6, the middle layers are called hidden because their inputs and outputs are masked by the activation function and final convolution. In a convolutional neural network, the hidden layers include layers that perform convolutions. Model 602b may comprise convolutional layers that convolve the input and pass its result to the next layer. Model 602b includes local and/or global pooling layers along with traditional convolutional layers. Pooling layers reduce the dimensions of data by combining the outputs of neuron clusters at one layer into a single neuron in the next layer. Also as shown, model 602b may comprise fully connected layers that connect every neuron in one layer to every neuron in another layer.

Figure 7:
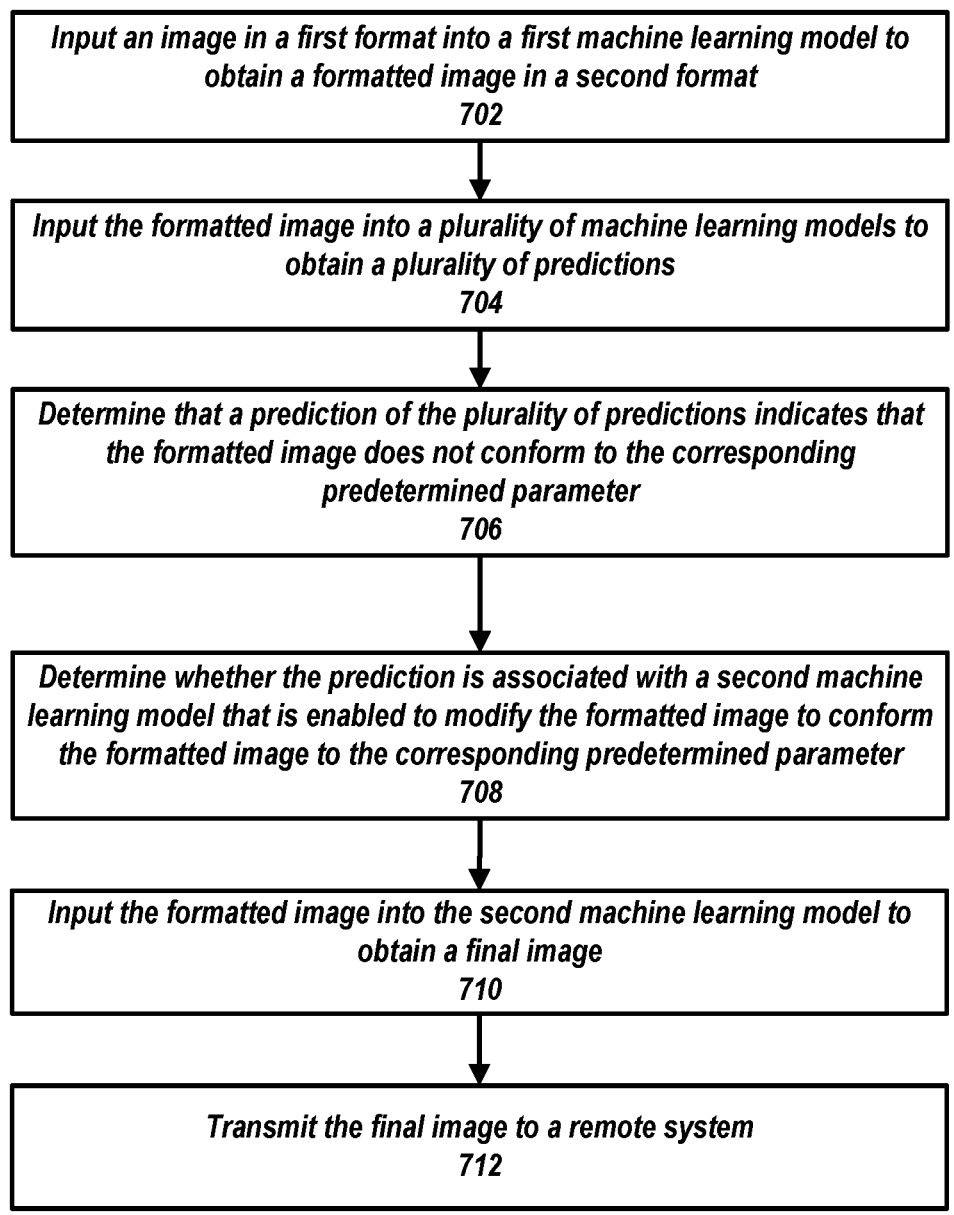
FIG. 7 shows a flowchart of the operations for validating image context and formatting, in accordance with one or more embodiments.

FIG. 7 shows a flowchart/process of the operations for validating image context and formatting. For example, the system may use process 700 (e.g., as implemented on one or more system components described above (e.g., in FIGS. 1-6)) in order to validate context and formatting of images. The operations described above may be performed on a user device (e.g., mobile device 622 or mobile device 624), in a cloud system, or using a combination of both. Thus, some operations may be performed on a user device, and some operations may be performed in the cloud. Mobile device 622 and or mobile device 624 may be user devices associated with users (e.g., smartphones, electronic tablets, etc.).

At 702, image validation system 102 inputs an image in a first format into a first machine learning model to obtain a formatted image in a second format. For example, image validation system 102 may input the image into a machine learning model described with respect to FIG. 5 and/or with respect to FIG. 6. In some embodiments, the image may be received from one of cloud components 610, a mobile device 622, or mobile device 624. Image validation system 102 may receive, from the first machine learning model, the image formatted in the second format.

At 704, image validation system 102 inputs the formatted image into a plurality of machine learning models to obtain a plurality of predictions. For example, image validation system 102 may input the image into a machine learning model described with respect to FIG. 5 and/or with respect to FIG. 6.

At 706, image validation system 102 determines that a prediction of the plurality of predictions indicates that the formatted image does not conform to the corresponding predetermined parameter. For example, image validation system 102 may perform this operation on mobile device 622, mobile device 624, or one of cloud components 610. For example, image validation system 102 may reside on a user device and may perform this operation on the user device. In some embodiments, image validation system 102 may perform this operation on one of cloud components 610.

At 708, image validation system 102 determines whether the prediction is associated with a second machine learning model that is enabled to modify the formatted image to conform the formatted image to the corresponding predetermined parameter. For example, image validation system 102 may perform this operation on mobile device 622, mobile device 624, or one of cloud components 610. For example, image validation system 102 may reside on a user device and may perform this operation on the user device. In some embodiments, image validation system 102 may perform this operation on one of cloud components 610.

At 710, image validation system 102 inputs the formatted image into the second machine learning model to obtain a final image. For example, image validation system 102 may perform the input operation on mobile device 622, mobile device 624, or one of cloud components 610. For example, image validation system 102 may reside on a user device and may communicate with machine learning models through a system bus or another suitable interface. In some embodiments, image validation system 102 may perform this operation on one of cloud components 610, for example, when the machine learning model resides in the cloud. In some embodiments, image validation system 102 may use an API call to the machine learning model in the cloud as part of this operation. At 712, image validation system 102 transmits the final image to a remote system. For example, image validation system 102 may use a network connection/network (e.g., network 150) for the transmission.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising inputting an image in a first format into a first machine learning model to obtain a formatted image in a second format, wherein the first machine learning model has been trained to output formatted images in a format that conforms to one or more object parameters associated with a physical object; inputting the formatted image into a plurality of machine learning models to obtain a plurality of predictions indicating whether the formatted image conforms to a plurality of predetermined parameters, wherein each machine learning model of the plurality of machine learning models is trained to predict a corresponding predetermined parameter of the plurality of predetermined parameters; determining that a prediction of the plurality of predictions indicates that the formatted image does not conform to the corresponding predetermined parameter; determining whether the prediction is associated with a second machine learning model that is enabled to modify the formatted image to conform the formatted image to the corresponding predetermined parameter; based on determining that the prediction is associated with the second machine learning model that is enabled to modify the formatted image to conform the formatted image to the corresponding predetermined parameter, inputting the formatted image into the second machine learning model to obtain a final image, wherein the second machine learning model is trained to modify images to conform with the corresponding predetermined parameter; and transmitting the final image to a printing system.

2. The method of any one of the preceding embodiments, further comprising, based on determining that the prediction is not associated with the second machine learning model: generating, using a third machine learning model, a plurality of keywords associated with the image; filtering the plurality of keywords based on a predetermined keyword set into a filtered keyword set; and retrieving, based on the filtered keyword set, a second image that is described by the filtered keyword set.

3. The method of any one of the preceding embodiments, wherein retrieving, based on the filtered keyword set, the second image that is described by the filtered keyword set further comprises inputting the filtered keyword set into a large language machine learning model to obtain the second image based on the filtered keyword set.

4. The method of any one of the preceding embodiments, wherein retrieving, based on the filtered keyword set, the second image that is described by the filtered keyword set further comprises: comparing the filtered keyword set with a plurality of keyword sets associated with a plurality of images stored in a database; determining, based on comparing the filtered keyword set with the plurality of keyword sets, a best matching keyword set; and selecting the second image that corresponds to the best matching keyword set.

5. The method of any one of the preceding embodiments, further comprising: causing a user device to generate for display a prompt prompting a user to select the image for printing on the physical object; and receiving the image from the user device.

6. The method of any one of the preceding embodiments, further comprising: causing a user device to generate for display a request for a user to describe the image to be printed on the physical object; receiving a description from the user device; and retrieving the image based on the description.

7. The method of any one of the preceding embodiments, wherein inputting the formatted image into the plurality of machine learning models to obtain the plurality of predictions indicating whether the formatted image conforms to the plurality of predetermined parameters further comprises: determining the plurality of predetermined parameters from available parameters; identifying the plurality of machine learning models corresponding to the plurality of predetermined parameters; and inputting the formatted image into each machine learning model of the plurality of machine learning models.

8. The method of any one of the preceding embodiments, further comprising: receiving a request to add a new predetermined parameter to the plurality of predetermined parameters; identifying a corresponding machine learning model for predicting the new predetermined parameter; and adding the corresponding machine learning model to the plurality of machine learning models.

9. The method of any one of the preceding embodiments, wherein inputting the formatted image into the plurality of machine learning models to obtain the plurality of predictions indicating whether the formatted image conforms to the plurality of predetermined parameters further comprises: inputting the formatted image into an image-to-text machine learning model to obtain an image description of the formatted image, wherein the image-to-text machine learning model has been trained to generate image descriptions based on objects within the image; comparing the image description with keyword sets associated with a subset of the plurality of predetermined parameters; and determining whether the image description matches one or more keyword sets.

10. The method of any one of the preceding embodiments, further comprising, based on determining that the image description matches a keyword set of the keyword sets, generating an indication that the formatted image does not conform to a corresponding parameter.

11. The method of any one of the preceding embodiments, further comprising: receiving a new image from a user device, wherein the new image comprises a subsequent attempt for the image to be printed onto an object; determining that the subsequent attempt meets a threshold number of attempts; and selecting a valid image from an image database, wherein the valid image is identified based on keywords associated with the new image, and wherein the image database stores valid images that conform to the plurality of predetermined parameters and to the one or more object parameters associated with the physical object.

12. A tangible, non-transitory, computer-readable medium storing instructions that, when executed by a data processing apparatus, cause the data processing apparatus to perform operations comprising those of any of embodiments 1-11.

13. A system comprising one or more processors; and memory storing instructions that, when executed by the processors, cause the processors to effectuate operations comprising those of any of embodiments 1-11.

14. A system comprising means for performing any of embodiments 1-11.

What is claimed is:

1. A system for validating image content and formatting, the system comprising:
one or more processors; and
one or more memories configured to store instructions that, when executed by the one or more processors, perform operations comprising:
receiving an image for printing on a physical object, wherein the image is in a first format;
inputting the image into a first machine learning model to obtain a formatted image in a second format, wherein the first machine learning model has been trained to output formatted images in a format that conforms to a layout, a color scheme, and a contrast for printing the image onto the physical object;
inputting the formatted image into a plurality of machine learning models to obtain a plurality of predictions indicating whether the formatted image conforms to a plurality of predetermined parameters, wherein each machine learning model of the plurality of machine learning models is trained to predict a corresponding predetermined parameter of the plurality of predetermined parameters;
determining that a prediction of the plurality of predictions indicates that the formatted image does not conform to the corresponding predetermined parameter;
determining whether the prediction is associated with a second machine learning model that is enabled to modify the formatted image to conform the formatted image to the corresponding predetermined parameter;
based on determining that the prediction is associated with the second machine learning model that is enabled to modify the formatted image to conform the formatted image to the corresponding predetermined parameter, inputting the formatted image into the second machine learning model to obtain a final image, wherein the second machine learning model is trained to modify images to conform with the corresponding predetermined parameter; and
transmitting the final image to a printing system, wherein the printing system prints the image onto the physical object.

2. A method for validating image content and formatting, the method comprising:
inputting an image in a first format into a first machine learning model to obtain a formatted image in a second format, wherein the first machine learning model has been trained to output formatted images in a format that conforms to one or more object parameters associated with a physical object;
inputting the formatted image into a plurality of machine learning models to obtain a plurality of predictions indicating whether the formatted image conforms to a plurality of predetermined parameters, wherein each machine learning model of the plurality of machine learning models is trained to predict a corresponding predetermined parameter of the plurality of predetermined parameters;
determining that a prediction of the plurality of predictions indicates that the formatted image does not conform to the corresponding predetermined parameter;
determining whether the prediction is associated with a second machine learning model that is enabled to modify the formatted image to conform the formatted image to the corresponding predetermined parameter;
based on determining that the prediction is associated with the second machine learning model that is enabled to modify the formatted image to conform the formatted image to the corresponding predetermined parameter, inputting the formatted image into the second machine learning model to obtain a final image, wherein the second machine learning model is trained to modify images to conform with the corresponding predetermined parameter; and
transmitting the final image to a printing system.

3. The method of claim 2, further comprising, based on determining that the prediction is not associated with the second machine learning model:
generating, using a third machine learning model, a plurality of keywords associated with the image;
filtering the plurality of keywords based on a predetermined keyword set into a filtered keyword set; and
retrieving, based on the filtered keyword set, a second image that is described by the filtered keyword set.

4. The method of claim 3, wherein retrieving, based on the filtered keyword set, the second image that is described by the filtered keyword set further comprises inputting the filtered keyword set into a large language machine learning model to obtain the second image based on the filtered keyword set.

5. The method of claim 3, wherein retrieving, based on the filtered keyword set, the second image that is described by the filtered keyword set further comprises:
comparing the filtered keyword set with a plurality of keyword sets associated with a plurality of images stored in a database;
determining, based on comparing the filtered keyword set with the plurality of keyword sets, a best matching keyword set; and
selecting the second image that corresponds to the best matching keyword set.

6. The method of claim 2, further comprising:
causing a user device to generate for display a prompt prompting a user to select the image for printing on the physical object; and
receiving the image from the user device.

7. The method of claim 2, further comprising:
causing a user device to generate for display a request for a user to describe the image to be printed on the physical object;
receiving a description from the user device; and
retrieving the image based on the description.

8. The method of claim 2, wherein inputting the formatted image into the plurality of machine learning models to obtain the plurality of predictions indicating whether the formatted image conforms to the plurality of predetermined parameters further comprises:
determining the plurality of predetermined parameters from available parameters;
identifying the plurality of machine learning models corresponding to the plurality of predetermined parameters; and
inputting the formatted image into each machine learning model of the plurality of machine learning models.

9. The method of claim 8, further comprising:
receiving a request to add a new predetermined parameter to the plurality of predetermined parameters;
identifying a corresponding machine learning model for predicting the new predetermined parameter; and
adding the corresponding machine learning model to the plurality of machine learning models.

10. The method of claim 2, wherein inputting the formatted image into the plurality of machine learning models to obtain the plurality of predictions indicating whether the formatted image conforms to the plurality of predetermined parameters further comprises:
inputting the formatted image into an image-to-text machine learning model to obtain an image description of the formatted image, wherein the image-to-text machine learning model has been trained to generate image descriptions based on objects within the image;
comparing the image description with keyword sets associated with a subset of the plurality of predetermined parameters; and
determining whether the image description matches one or more keyword sets.

11. The method of claim 10, further comprising, based on determining that the image description matches a keyword set of the keyword sets, generating an indication that the formatted image does not conform to a corresponding parameter.

12. The method of claim 2, further comprising:
receiving a new image from a user device, wherein the new image comprises a subsequent attempt for the image to be printed onto an object;
determining that the subsequent attempt meets a threshold number of attempts; and
selecting a valid image from an image database, wherein the valid image is identified based on keywords associated with the new image, and wherein the image database stores valid images that conform to the plurality of predetermined parameters and to the one or more object parameters associated with the physical object.

13. One or more non-transitory, computer-readable media storing instructions thereon that cause one or more processors to perform operations comprising:
inputting an image in a first format into a first machine learning model to obtain a formatted image in a second format, wherein the first machine learning model has been trained to output formatted images in a format that conforms to one or more object parameters associated with a physical object;
inputting the formatted image into a plurality of machine learning models to obtain a plurality of predictions indicating whether the formatted image conforms to a plurality of predetermined parameters, wherein each machine learning model of the plurality of machine learning models is trained to predict a corresponding predetermined parameter of the plurality of predetermined parameters;
determining that a prediction of the plurality of predictions indicates that the formatted image does not conform to the corresponding predetermined parameter;
determining whether the prediction is associated with a second machine learning model that is enabled to modify the formatted image to conform the formatted image to the corresponding predetermined parameter;
based on determining that the prediction is associated with the second machine learning model that is enabled to modify the formatted image to conform the formatted image to the corresponding predetermined parameter, inputting the formatted image into the second machine learning model to obtain a final image, wherein the second machine learning model is trained to modify images to conform with the corresponding predetermined parameter; and
transmitting the final image to a printing system.

14. The one or more non-transitory, computer-readable media of claim 13, wherein the instructions further cause the one or more processors, based on determining that the prediction is not associated with the second machine learning model, to perform operations comprising:
generating, using a third machine learning model, a plurality of keywords associated with the image;
filtering the plurality of keywords based on a predetermined keyword set into a filtered keyword set; and retrieving, based on the filtered keyword set, a second image that is described by the filtered keyword set.

15. The one or more non-transitory, computer-readable media of claim 14, wherein the operations for retrieving, based on the filtered keyword set, the second image that is described by the filtered keyword set further cause the one or more processors to input the filtered keyword set into a large language machine learning model to obtain the second image based on the filtered keyword set.

16. The one or more non-transitory, computer-readable media of claim 14, wherein the operations for retrieving, based on the filtered keyword set, the second image that is described by the filtered keyword set further cause the one or more processors to perform operations comprising:
   comparing the filtered keyword set with a plurality of keyword sets associated with a plurality of images stored in a database;
   determining, based on comparing the filtered keyword set with the plurality of keyword sets, a best matching keyword set; and
   selecting the second image that corresponds to the best matching keyword set.

17. The one or more non-transitory, computer-readable media of claim 13, wherein the operations further cause the one or more processors to perform operations comprising:
   causing a user device to generate for display a prompt prompting a user to select the image for printing on the physical object; and
   receiving the image from the user device.

18. The one or more non-transitory, computer-readable media of claim 13, wherein the operations further cause the one or more processors to perform operations comprising:
   causing a user device to generate for display a request for a user to describe the image to be printed on the physical object;
   receiving a description from the user device; and
   retrieving the image based on the description.

19. The one or more non-transitory, computer-readable media of claim 13, wherein the operations for inputting the formatted image into the plurality of machine learning models to obtain the plurality of predictions indicating whether the formatted image conforms to the plurality of predetermined parameters further cause the one or more processors to perform operations comprising:
   determining the plurality of predetermined parameters from available parameters;
   identifying the plurality of machine learning models corresponding to the plurality of predetermined parameters; and
   inputting the formatted image into each machine learning model of the plurality of machine learning models.

20. The one or more non-transitory, computer-readable media of claim 19, wherein the operations further cause the one or more processors to perform operations comprising:
   receiving a request to add a new predetermined parameter to the plurality of predetermined parameters;
   identifying a corresponding machine learning model for predicting the new predetermined parameter; and
   adding the corresponding machine learning model to the plurality of machine learning models.

* * * * *